Nov. 8, 1960    M. G. TOWNSLEY    2,958,970
SLIDE HOLDER
Filed June 30, 1959    2 Sheets-Sheet 1
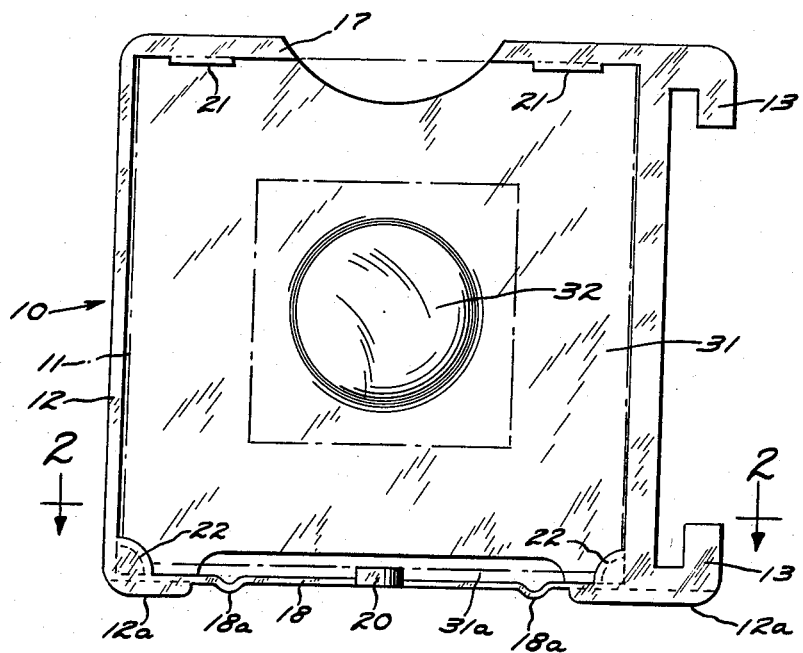
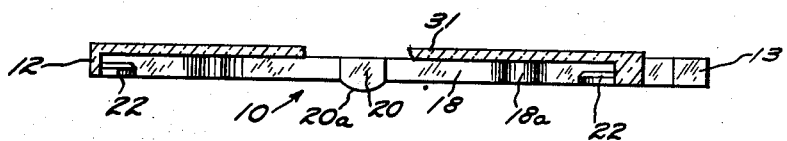
INVENTOR
Malcolm G. Townsley
BY Robert F. Michel
Atty.

Nov. 8, 1960 M. G. TOWNSLEY 2,958,970
SLIDE HOLDER

Filed June 30, 1959 2 Sheets-Sheet 2

INVENTOR.
Malcolm G. Townsley
BY
Robert F. Miehle
Atty.

United States Patent Office 2,958,970
Patented Nov. 8, 1960

2,958,970
SLIDE HOLDER

Malcolm G. Townsley, Park Ridge, Ill., assignor to Bell & Howell Company, Chicago, Ill., a corporation of Illinois Filed June 30, 1959, Ser. No. 823,883

10 Claims. (Cl. 40—152)

This invention relates to a slide holder, and more particularly to a slide holder for use in slide projectors having automatic slide changers and adapted to retain itself in a slide tray.

An object of the invention is to provide a new and improved slide holder for resiliently locking a slide therein and also resiliently holding itself in a slide tray.

Another object of the invention is to provide a slide holder including a single spring which both locks a slide to the slide holder and resiliently engages a septum wall of a magazine to hold the slide holder therein.

Another object of the invention is to provide a slide holder having a frame relative to which a slide may be tilted for insertion and removal together with a spring which urges the slide up into a retaining structure in the frame and also projects laterally of the holder to engage the septum walls of a tray to hold the holder in the tray.

Further objects and features of the invention will be apparent from the following detailed description of slide holders forming specific embodiments thereof, when read in conjunction with the appended drawings, in which:

Fig. 1 is a front elevation view of a slide holder forming one embodiment of the invention;

Fig. 2 is an enlarged horizontal sectional view taken along line 2—2 of Fig. 1;

The invention provides a slide holder adapted to receive a card mounted slide, and including a frame open at one side with a retaining portion at the upper edge thereof for holding the slide in the frame as it is pressed by a leaf spring member of the holder and also projecting beyond the frame to resiliently engage the septum wall of a slide tray to retain the holder in the tray. Preferably the slide holder is a one-piece plastic member with the leaf spring member joined at both ends to the lower corners of the frame portion and adapted to urge a slide into a retaining portion at the top of the frame and also projecting laterally of the frame to engage a partition wall of a tray.

Figure 3:
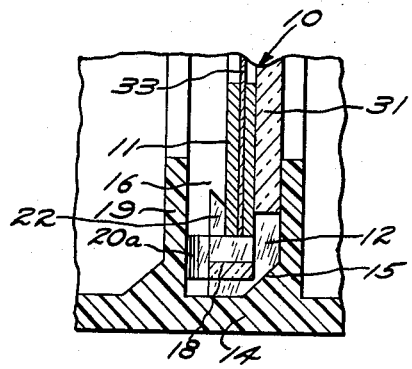
Fig. 3 is a fragmentary vertical section of the slide holder of Fig. 1 shown in a slide tray.

Referring now in detail to the drawings, there is shown in Figs. 1 to 3 a slide holder 10 of one piece and formed of transparent molded plastic material such as, for example, methyl methacrylate, or polymerized styrene. The slide holder permits insertion and removal of a slide mount 11. The slide holder includes a frame portion 12 and a pair of thick, strong hooks or interlocking members 13 for pulling the holder from a tray 14 (Fig. 3) and pushing the holder back into the tray by a pulling mechanism of a slide projector disclosed and claimed in co-pending application Serial No. 799,404 for "A Slide Projector" and assigned to the same assignee as the instant application. The frame has a beveled or relieved lower edge 15 and the receiving septum 16 of the tray is formed complementary thereto. Upper edge 17 of the frame is unrelieved so that the holder cannot be inserted into the tray backwards. The holder has an integral leaf spring finger 18 having an integral projection 20 and urging the slide mount 11 upwardly under tabs 21 of the holder, and projecting outwardly from the front side of the frame to press against septum side or partition wall 19 to retain the holder in the tray even when the tray is tipped to a position which would spill other types of holders from the tray. Lower, beveled corner tabs 22 act with the tabs 21 to hold the slide mount in the frame. The tray is disclosed and claimed in co-pending application Serial No. 786,294 for "Slide Tray And Slide Holder" and assigned to the same assignee as the instant application.

The spring member has undulating or pleated portions 18a at the ends thereof to provide resiliency thereto, and provide resilient connections to the frame 12. Corner portions 12a project below the spring 18 to permit free vertical movement. Also, a clearance opening 31a in thin transparent panel 31 is provided above the spring 18. The panel has a focus-locking bubble 32 for preventing movement of the transparency 33 of the slide from moving out of the focal plane.

As best shown in Figs. 2 and 3, the projection 20 has a rounded front portion 20a resiliently engaging the septum wall 19 to hold the holder against spilling. The spring 18 with its undulating portions 18a flexes horizontally to provide this resiliency. Thus, the spring performs the dual function of resiliently holding the slide locked under the tabs 21 and resiliently holding the slide holder in the tray.

Figure 4:
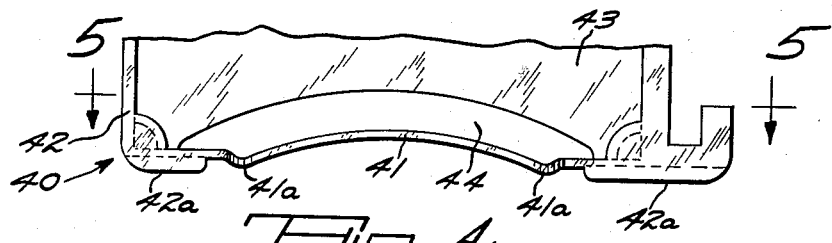
Fig. 4 is a fragmentary, front elevation view of a slide holder forming an alternate embodiment of the invention.
Figure 5:
Fig. 5 is an enlarged horizontal sectional view taken along line 5—5 of Fig. 4.

A slide holder 40 (Figs. 4 and 5) forming an alternate embodiment of the invention is substantially identical with the slide holder 10 except for a spring 41 thereof. The spring 41 bows both vertically upwardly and horizontally toward the front. The vertical bowing provides resiliency for insertion of the slide mount into the holder 41 and for holding the mount up under the tabs corresponding to the tabs 21 (Fig. 1). The horizontal bowing causes the spring 41 to project out in front of the frame 42 for resiliently engaging the side wall of a tray septum to hold the slide holder in the tray. The holder has a transparent panel 43 having a cut out or clearance opening 44 for the spring 41. Undulating, resilient end portions 41a join the spring to rigid corner portions 42a of the frame, and the corner portions project substantially below the spring 41 to provide clearance for the spring when the slide holder is in a tray.

In the above slide holders, the springs 18 and 41 both hold the slide and hold the slide holders in the tray septums. The spring construction is simple and durable.

While the invention is thus described, it is not wished to be limited to the precise details described, as changes may be readily made without departing from the spirit of the invention.

What is claimed is:

1. In a slide holder adapted to slide into a tray septum, a frame having a retaining portion at one edge, and a spring member at the edge of the frame opposite to said one edge for pressing a slide into the retaining portion, the spring member also projecting beyond the frame to resiliently engage a wall of the tray septum.

2. In a slide holder adapted to fit into a tray septum, a panel, a frame extending around the panel, tab means at one edge of the panel for holding an edge of a slide with the panel, and a spring member spaced from said edge and secured to the frame for pressing a slide under the tab means, the spring member also projecting beyond the frame in a position to engage the tray and resiliently hold the slide holder in the tray.

3. In a slide holder adapted to retain itself in a tray septum, a frame having over-hanging retaining means at one edge, and a bowed spring member at the opposite edge for pressing a slide into the retaining means, the spring member also projecting beyond the frame for resiliently engaging a wall of the septum.

4. In a slide holder, a frame having one edge against which a slide may be pressed and also having side edges, and a spring member secured at its ends to the side edges for pressing the slide against said one edge, the spring member also having a portion projecting laterally of the frame for engaging a septum wall of a tray to hold the frame frictionally in the tray.

5. The slide holder of claim 4 wherein the spring member is bowed toward said one edge and also is bowed beyond the frame so as to engage the septum wall.

6. The slide holder of claim 4 wherein the spring has at least one pleated portion to permit flexing thereof.

7. The slide holder of claim 4 and including a pair of flexible undulating portions at the end of the spring member and connecting the spring member to the frame.

8. The slide holder of claim 7 and including a projection on the central portion of the spring member projecting toward said one edge and also projecting laterally beyond the frame for engaging the septum wall.

9. In a slide holder, a transparent panel, a frame having a top edge member and side edge members projecting forwardly relative to the panel, the frame also having aligned lower corner portions projecting forwardly relative to the panel and spaced substantially apart, a spring member integral with the frame and having a free central portion and undulating end portions connected to the lower corner portions for pressing a slide against the top edge, tab means at the upper edge for holding the slide against the panel, and tab means at the lower corner portions for holding the slide against the panel.

10. The slide holder of claim 9 wherein the spring member extends upwardly toward the top edge and forwardly beyond the lower corner portions so as to engage a septum wall of a tray to tend to retain the holder in the tray.

References Cited in the file of this patent
UNITED STATES PATENTS

| | | |
|---|---|---|
| 1,210,934 | Hayes | Jan. 2, 1917 |
| 2,241,263 | Koppe | May 6, 1941 |
| 2,837,851 | Wilkund | June 10, 1958 |